United States Patent [19]

Matsumoto et al.

[11] Patent Number: 5,409,659
[45] Date of Patent: Apr. 25, 1995

[54] HOLLOW INJECTION-MOLDING METHOD AND PRESSURIZED FLUID INTRODUCING AND DISCHARGING APPARATUS THEREFOR

[75] Inventors: Hiroyuki Matsumoto, Tokyo; Susumu Imai; Masahiro Takeyasu, both of Kanagawa, all of Japan

[73] Assignee: Asahi Kasei Kogyo Kabushiki Kaisha, Osaka, Japan

[21] Appl. No.: 108,570

[22] PCT Filed: Dec. 24, 1992

[86] PCT No.: PCT/JP92/01693

§ 371 Date: Aug. 27, 1993

§ 102(e) Date: Aug. 27, 1993

[87] PCT Pub. No.: WO93/12919

PCT Pub. Date: Jul. 8, 1993

[30] Foreign Application Priority Data

Dec. 27, 1991 [JP] Japan .................. 3-357962

[51] Int. Cl.⁶ .............. B29C 45/00; B29D 22/00
[52] U.S. Cl. ................ 264/572; 264/328.7; 264/328.8; 264/328.12; 264/328.13; 425/130; 425/557; 425/562; 425/573
[58] Field of Search ........... 264/328.7, 328.8, 328.12, 264/328.13, 572; 425/130, 522, 535, 542, 557, 559, 562, 567, 573

[56] References Cited

U.S. PATENT DOCUMENTS

| | | | |
|---|---|---|---|
| 4,740,150 | 4/1988 | Sayer | 425/542 |
| 5,080,570 | 1/1992 | Baxi et al. | 425/130 |
| 5,127,814 | 7/1992 | Johnson et al. | 425/130 |
| 5,173,241 | 12/1992 | Shibuya et al. | 264/572 |
| 5,198,177 | 3/1993 | Sugiyama et al. | 264/572 |
| 5,198,238 | 3/1993 | Baxi | 425/130 |

FOREIGN PATENT DOCUMENTS

| | | |
|---|---|---|
| 363948 | 4/1990 | European Pat. Off. . |
| 48-41264 | 12/1973 | Japan . |
| 55-291 | 1/1980 | Japan . |
| 59-19017 | 5/1984 | Japan . |
| 60-24913 | 2/1985 | Japan . |
| 64-14012 | 1/1989 | Japan . |
| 3-224719 | 10/1991 | Japan . |
| WO92/22413 | 12/1992 | WIPO . |

*Primary Examiner*—Leo B. Tentoni
*Attorney, Agent, or Firm*—Finnegan, Henderson, Farabow, Garrett & Dunner

[57] ABSTRACT

The invention relates to a hollow injection-molding method of forming a hollow portion in molten resin in a mold cavity by introducing a pressurized fluid, and also to a pressurized fluid introducing and discharging apparatus therefor, and has an object of eliminating the backflow of the molten resin into a pressurized fluid passage. A gap between a cylindrical sleeve and a shaft core inserted into the sleeve is used as the pressurized fluid passage. The front end of the shaft core is projected into a mold beyond the sleeve front end to serve as a guide face. By sliding the shaft core, the state of an opening portion of the pressurized fluid passage in the side of the mold is changed between a narrowed state where the pressurized fluid can pass through the opening portion but the molten resin cannot enter the opening portion and a widened state allowing the pressurized fluid to rapidly discharge. The guide face allows the pressurized fluid to be reliably introduced into the mold cavity.

15 Claims, 7 Drawing Sheets

HOLLOW INJECTION-MOLDING METHOD AND PRESSURIZED FLUID INTRODUCING AND DISCHARGING APPARATUS THEREFOR

TECHNICAL FIELD

This invention relates to a hollow injection-molding method of forming a hollow portion of molten resin in a mold cavity by introducing a pressurized fluid, and the invention also relates to a pressurized fluid introducing and discharging apparatus therefor. More particularly, the invention relates to a hollow injection-molding method wherein a pressurized fluid is directly introduced into molten resin in a mold such as a sprue, a runner and a mold cavity, and the pressurized fluid in the hollow portion is discharged through the pressurized fluid introducing passage, and the invention also relates to a pressurized fluid introducing and discharging apparatus therefor.

BACKGROUND ART

Conventional hollow injection-molding methods of forming a hollow portion in molten resin in a mold cavity by introducing a pressurized fluid, wherein the pressurized fluid is directly introduced into molten resin in a mold cavity and the pressurized fluid in the hollow portion is discharged through the introducing passage for the pressurized fluid, and a pressurized fluid introducing apparatus therefor are disclosed in Examined Japanese PatentPublications Nos. SHO. 48-41264, and SHO. 59-19017, and U.S. Pat. No. 4,740,150.

Examined Japanese PatentPublication No. SHO. 48-41264 discloses a hollow injection-molding method and a pressurized fluid introducing and discharging apparatus therefor wherein, as shown in FIG. 11, a thin cylindrical projection 102 having a pressurized fluid passage 101 therein is disposed so that it can be projected into and retracted from a mold 103. While the projection 102 is projected into the mold 103, molten resin is injected and a pressurized fluid is introduced from the pressurized fluid passage 101, thereby forming a hollow portion. After cooling and solidification, the pressurized fluid is discharged from the hollow portion through the pressurized fluid passage 101. The projection 102 is retracted from the mold 103, and then the mold article is removed.

Examined Japanese PatentPublication No. SHO. 59-19017 discloses a hollow injection-molding method and a pressurized fluid introducing and discharging apparatus therefor wherein, as shown in FIG. 12, a valve 107 operated by a cylinder 106 to open and close the pressurized fluid passage 101 is disposed in the intermediate portion of a molten-resin passage 105 through which injected molten resin is guided to a mold cavity 104. A pressurized fluid is introduced and discharged through the valve 107 and the pressurized fluid passage 101.

U.S. Pat. No. 4,740,150 discloses an injection-molding method and a pressurized fluid introducing and discharging apparatus therefor wherein a pressurized fluid is introduced into molten resin injected into a mold cavity, through a non-return valve and a nozzle having a pressurized fluid introducing passage which can be communicated with the mold cavity. After the resin solidifies, the nozzle is retracted to open the valve port so that the pressurized fluid in the resin is discharged to the atmosphere.

However, these hollow injection-molding methods and pressurized fluid introducing and discharging apparatuses therefor have following problems.

The hollow injection-molding method and the pressurized fluid introducing and discharging apparatus therefor which are disclosed in Examined Japanese PatentPublication No. SHO. 48-41264 have problems as follows: When molten resin is injected, the molten resin flows back into the pressurized fluid passage 101 in the projection 102, thereby causing the pressurized fluid passage 101 to be clogged. In order to prevent the backflow of molten resin, it may be considered that the bore diameter of the pressurized fluid passage is reduced. However, the time to discharge the pressurized fluid from the hollow portion then increases, thus increasing mold cycle time and reducing mold efficiency.

The hollow injection-molding method and the pressurized fluid introducing and discharging apparatus therefor which are disclosed in Examined Japanese Patent Publication No. SHO. 59-19017 have problems as follows: When the valve 107 is opened during the introduction of the pressurized fluid, the molten resin flows back into the pressurized fluid passage 101 through the opened valve 107, thereby causing the pressurized fluid passage 101 to be clogged. Furthermore, the pressurized fluid in the introduction process may fail to be introduced into the molten resin and leak out through the molten resin and the inner surface of the mold 103 to the atmosphere. As a result, a hollow portion can not be formed or the pressure of the pressurized fluid in a hollow portion is not maintained at a required level, thereby causing a poor moldability.

The hollow injection-molding method and a pressurized fluid introducing and discharging apparatus therefor which are disclosed in U.S. Pat. No. 4,740,150 have problems as follows: The apparatus has the nozzle functioning as a valve member and the valve seat, and in which the pressurized fluid introducing passage is formed in the nozzle and a pressurized fluid discharging passage is formed outside the nozzle. Such a construction causes the valve member and valve seat to have a complex structure, and since the pressurized fluid introducing passage is separated from the discharging passage, the structure of the pressurized fluid introducing and discharging apparatus is complicated. Furthermore, since the introducing passage is closed by the non-return valve, except when the pressurized fluid is introduced, the mechanism of operating the non-return valve is further complicated.

The invention was made in view of the above-mentioned problems, and has an object of preventing the backflow of molten resin into a pressurized fluid passage and performing sure introduction and rapid discharging of the pressurized fluid.

SUMMARY OF THE INVENTION

In the invention, a hollow injection-molding method wherein a pressurized fluid is introduced from a pressurized fluid passage so as to form a hollow portion in molten resin in a mold cavity, and, after the molten resin in the mold cavity cools and solidifies, the pressurized fluid in the hollow portion is discharged through the pressurized fluid passage 1 and the hollow injection-molded article is then removed. In the method, an opening portion of the pressurized fluid passage in the side of a mold is set to a narrowed state where the pressurized fluid can pass through the opening portion but the molten resin cannot enter the opening portion, a guide face is projected into the mold from the opening portion of the introducing passage in the side of the mold along the opening direction, and the opening portion of the pressurized fluid passage in the side of the mold is widened from the narrow sate to a widened state to discharge the pressurized fluid in the hollow portion.

Furthermore, in the invention, a pressurized fluid introducing and discharging apparatus is constructed as follows: A shaft core is inserted into a sleeve whose front end opens to the mold with remaining a gap as the pressurized fluid passage between an inner face of the sleeve and the shaft core. The width of the opening portion of the pressurized fluid passage in the side of the mold can be changed by moving the shaft core, from the narrowed state having the width in which the pressurized fluid can pass through the opening portion but the molten resin cannot enter the opening portion, to the widened state exceeding the narrowed state or vice versa. The front end of the shaft core projects beyond the front end face of the sleeve at least when the opening portion is in the narrowed state, and the outer peripheral face of the front end of the shaft core which is projected beyond the front end face of the sleeve constitutes a guide face which is projected into the mold from the opening portion of the pressurized fluid passage in the side of the mold along the opening direction.

DETAILED DESCRIPTION OF THE INVENTION

Figure 1:
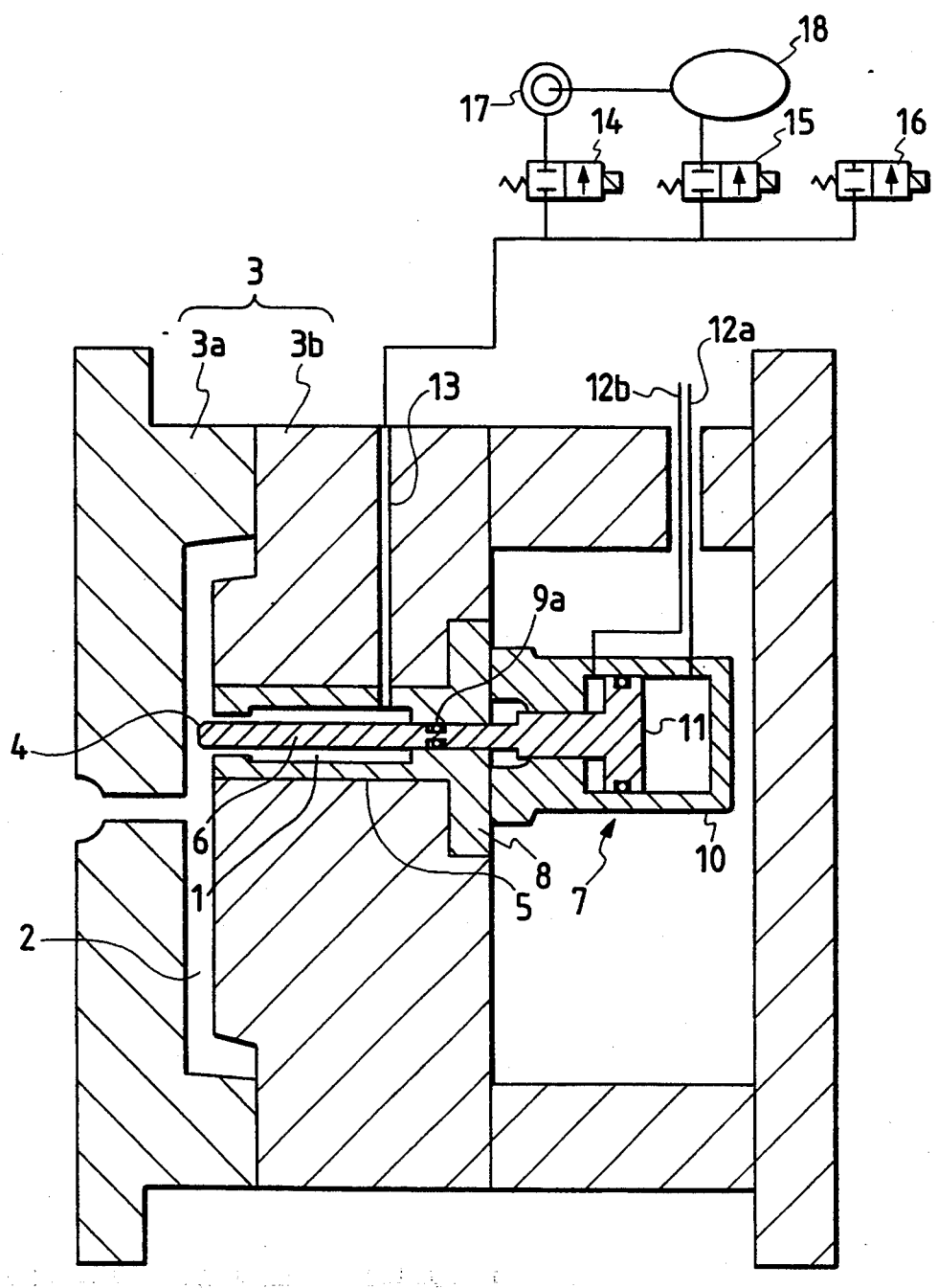
FIG. 1 is a longitudinal section view showing a first embodiment of the invention.

FIG. 1 is a longitudinal section view showing a first embodiment of the pressurized fluid introducing and discharging apparatus. The mold 3 consists of a stationary mold 3a and a movable mold 3b, and the mold cavity 2 is formed between them. The pressurized fluid introducing and discharging apparatus comprises as main components the sleeve 5, the shaft core 6 and a driving device 7, and the apparatus is disposed relative to the mold cavity 2 in the movable mold 3b.

It is not necessary to dispose the pressurized fluid introducing and discharging apparatus in the movable mold 3b as illustrated. The apparatus may be disposed in the stationary mold 3a. Alternatively, the pressurized fluid introducing and discharging apparatus may be disposed relative to not only the mold cavity 2 but also another space in the mold 3 where molten resin flows such as a sprue or a runner. A plurality of pressurized fluid introducing and discharging apparatuses may be disposed so as to be directed to a single space in the mold 3, or to be respectively directed to plural spaces in the mold 3.

The sleeve 5 of the pressurized fluid introducing and discharging apparatus has a cylindrical shape, a front end of the sleeve opens into the mold 3, e.g., mold cavity 2, for introducing and discharging the presurized fluid, and the sleeve is locked to the movable mold 3b by a flange 8 formed in a rear end portion thereof.

The cylindrical shaft core 6 is inserted into the center portion of the sleeve 5 so that an annular gap serving as the pressurized fluid passage 1 is formed between the shaft core and the inner face of the sleeve 5. An O-ring 9a functioning as a seal is lain between the rear end of the sleeve 5 and the shaft core 6. The rear end of the shaft core 6 is projected beyond the rear end of the sleeve 5 and is connected to the driving device 7.

The driving device 7 is a hydraulic device which consists of a cylinder 10 and a piston 11, and is driven by a hydraulic pressure applied from a hydraulic line 12a or 12b. The rear end of the shaft core 6 is connected to the piston 11. Accordingly, the shaft core 6 slides back and forth along a center axis thereof in the sleeve 5 with moving the piston 11 of the driving device 7.

A front end of a pressurized fluid supply and drain passage 13 is connected to the pressurized fluid passage 1, and the passage is formed in the movable mold 3. To the rear end of the pressurized fluid supply and drain passage 13, an introduction control valve 14, a recovery control valve 15, and an atmospheric release control valve 16 are connected in parallel. A pressurized fluid source 17 is connected to the introduction control valve 14, end a recovery vessel 18 is connected to the recovery control valve 15. Therefore, by controlling the opening and closing of the control valves 14, 15 and 16, the supply of the pressurized fluid from the pressurized fluid source 17 to the mold 3, the recovery of the pressurized fluid from the mold 3 to the recovery vessel 18, and the discharge of the pressurized fluid in the mold 3 to the atmosphere can be respectively conducted through the pressurized fluid supply and drain passage 13 and the pressurized fluid passage 1.

Figure 2:
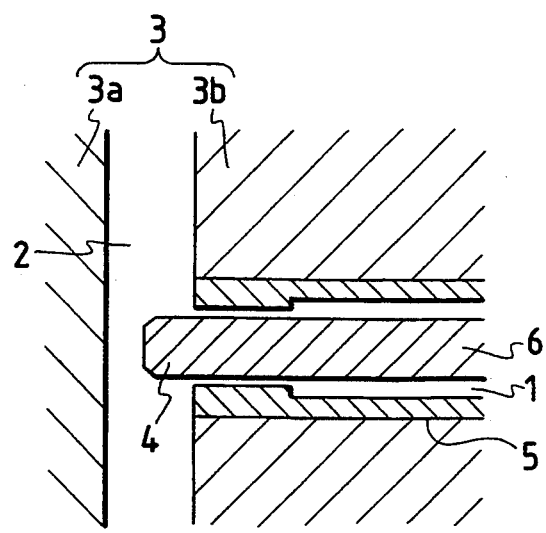
FIG. 2 is a diagram illustrating the narrowed state of an opening portion of a pressurized fluid passage in the side of a mold.

FIG. 1 shows the state where the shaft core 6 is advanced by the driving device 7. As shown in FIG. 2 at an enlarged scale, the front end of the shaft core 6 in this state is projected beyond the front end face of the sleeve 5 and into the mold cavity 2. In the pressurized fluid passage 1 in this state, since the inner diameter of the front end of the sleeve 5 is smaller than that of the rear portion of the sleeve, and therefore the opening portion in the side of the mold 3 is made smaller in width than the other portions. At this time, the opening portion of the pressurized fluid passage 1 in the side of the mold 3 is in the narrowed state where the pressurized fluid can pass through the opening portion but the molten resin cannot enter the opening portion.

Figure 3:
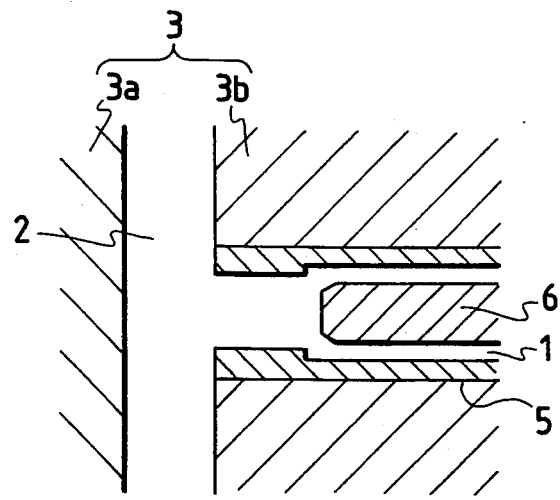
FIG. 3 is a diagram illustrating the widened state of the opening portion of the pressurized fluid passage in the side of the mold.

In contrast, when the shaft core 6 is retracted by the driving device 7 so that the front end of the shaft core 6 is retracted to the portion of the sleeve 5 having a larger inner diameter as shown in FIG. 3, the opening portion of the pressurized fluid passage 1 in the side of the mold 3 is widened to be in the widened state where the pressurized fluid can pass more easily as compared with the narrowed state.

The length in the axial direction and width of the pressurized fluid passage 1 of the portion for forming the narrow state can be selected depending on the viscosity and pressure of the molten resin in the mold 3. Generally, the length in the axial direction is 1 to 50 mm, preferably 3 to 20 mm, and the width is 0.02 to 0.2 mm, preferably 0.05 to 0.15 mm.

Since the narrowed state is set by the difference between the inner diameter of the sleeve 5 and the outer diameter of the shaft core 6, it is possible to perform the machining by a machine tool of a usual accuracy with an excellent repetitive reproducibility.

As described above, when the shaft core 6 is advanced, its front end is projected beyond the front end face of the sleeve 5 and into the mold 3, and the outer peripheral face of the projected front end of the shaft core 6 constitutes the guide face 4 which is projected into the mold 3 from the opening portion of the pressurized fluid passage 1 in the side of the mold 3 along the opening direction. Although the guide face 4 is covered with the molten resin, the guide face 4 guides the introduced pressurized fluid so that it is surely directed into the molten resin.

Figure 4:
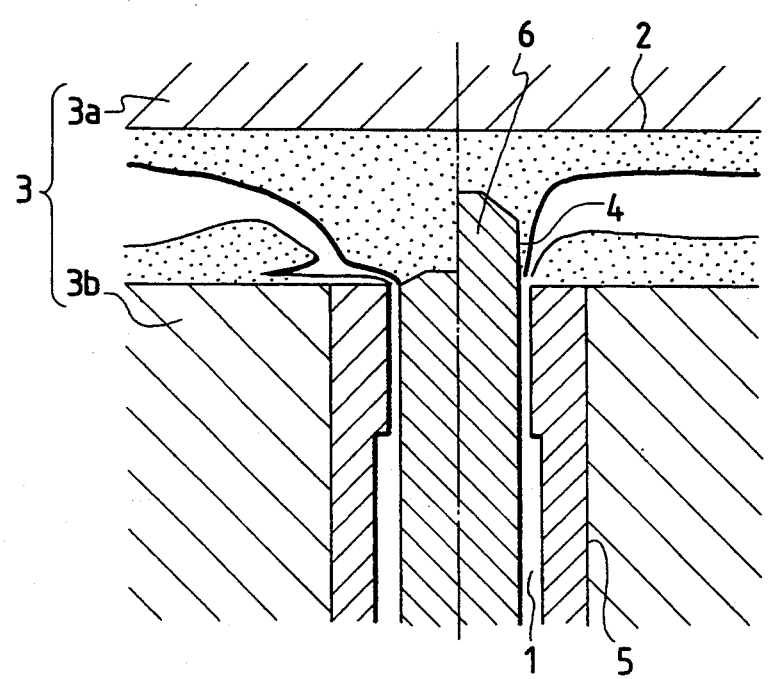
FIG. 4 is a diagram illustrating the operation of a guide face according to the invention.

The function of the guide face 4 for guiding the pressurized fluid will be further described with reference to FIG. 4. When the guide face 4 is projected into the mold 3 as described above, as shown in the right side of FIG. 4, the pressurized fluid flowing out from the pressurized fluid passage 1 is guided along the guide face 4 and toward the inside of the mold 3, and thereafter the pressurized fluid further advances in the molted resin so that the pressurized fluid can be introduced into the vicinity of the center portion of the molten resin. In contrast, if the guide face 4 does not exist, as shown in the left side of FIG. 4, the pressurized fluid flowing out from the pressurized fluid passage 1 is guided along the front end face of the sleeve 5 and toward the inner face of the mold 3, and thereafter the pressurized fluid further advances into the molten resin. Accordingly, the pressurized fluid is liable to enter the interface of the molten resin and the inner face of the mold 103, thereby allowing easily the leakage of the pressurized fluid.

Preferably, the degree of the projection of the guide face 4 is adjusted by the interval of the shaft core 6 along the projection direction of the shaft core 6 in the space of the mold 3 wherein the shaft core 6 is projected (hereinafter, the interval is referred to as "corresponding mold space interval"). It is preferable to set the projection degree to be not less than 0.01 mm and not more than a half of the corresponding mold space interval. Generally, it is preferable to set the projection degree to be from 0.05 mm to 5 mm.

With respect to the shape of the front end portion of the projected shaft core 6, if the above-described projection degree of the guide face 4 is held, a part being over the degree of the projected shaft may have an arbitrary shape such as a circularcone, a truncate cone and a hemisphere.

Next, the hollow injection-molding method of the invention will be described by illustrating an example employing the mold 3 comprising the pressurized fluid introducing and discharging apparatus described above.

First, the mold 3 is closed and a hydraulic pressure is applied through the hydraulic line 12a to the driving device 10 so as to advance the piston 11, whereby the shaft core 6 is held at the advanced position as shown in FIGS. 1 and 2. In other words, the opening portion of the pressurized fluid passage 1 in the side of the mold 3 is set to the narrowed state, and the guide face 4 which is the outer peripheral face of the front end of the shaft core 6, is projected into the mold 3 from the opening portion of the pressurized fluid passage 1 in the side of the mold 3 along the opening direction.

Then, molten resin is injected into the mold 3 from an injection cylinder (not shown) of an injection molder.

After the start of the injection of molten resin, the introduction control valve 14 connected to the pressurized fluid source 17 is opened to initiate the introduction of the pressurized fluid. At this time, the recovery control valve 15 and the atmospheric release control valve 16 are closed.

The pressurized fluid is introduced, after injection of a part of molten resin required for molding, with the injection of the remaining part of the molten resin, or after completing the injection of all parts of the molten resin. The pressurized fluid has a low viscosity at room temperature and does not react with resin under the temperature and pressure during time of the injection molding. Specifically, an inert gas such as nitrogen, a gas such as air, a liquid such as water, a resin oligomer or the like can be used. Particularly, it is preferable to use an inert gas such as nitrogen.

When the introduction control valve 14 is opened, the pressurized fluid is introduced into molten resin in the mold 3 from the pressurized fluid source 17 through the pressurized fluid supply and drain passage 13 and the pressurized fluid passage 1. When the pressurized fluid introducing and discharging apparatus is disposed to the mold cavity 2, the pressurized fluid is directly introduced into molten resin in the mold cavity 2 so as to form a hollow portion. When the pressurized fluid introducing apparatus is disposed to the sprue or the runner, the pressurized fluid is introduced into molten resin being injected into the mold cavity 2 and flows together with the molten resin into the mold cavity 2 so that a hollow portion is also formed in the molten resin in the mold cavity 2.

After the elapse of a preset period, the introduction control valve 14 is closed, and this state is maintained for a preset period. During this period, while the molten resin in the mold cavity 2 is urged to the inner face of the mold cavity 2 by the pressure of the pressurized fluid in the hollow portion which is formed in the resin in the mold cavity 2, the molten resin in the mold cavity 2 cools down and solidifies.

After the molten resin in the mold cavity 2 cools down to a state where at least the surface of the resin solidifies and the resin is not deformed even when it is removed from the mold 3, the recovery control valve 15 connected to the recovery vessel 18 is opened. At the same time, a hydraulic pressure is applied through the hydraulic line 12b to the driving device 7 of the pressurized fluid introducing and discharging apparatus, and the retraction of the piston 11 causes the shaft core 6 to be retracted, whereby the opening portion of the pressurized fluid passage 1 in the side of the mold 3 is made the widened state shown in FIG. 3.

As a result of the above operations, the pressurized fluid in the hollow portion flows into the pressurized fluid passage 1 through the opening portion of the pressurized fluid passage 1 in the side of the mold 3 in which the portion is in the widened state, and the pressurized fluid is recovered into the recovery vessel 18 through the pressurized fluid supply and drain passage 13. Remains of the pressurized fluid which can not be recovered into the recovery vessel 18 are discharged into the atmosphere by closing the recovery control valve 15 after the elapse of a predetermined period and opening the atmospheric release control valve 16 for a predetermined period.

The pressurized fluid from the hollow portion may be discharged by releasing all of the pressurized fluid into the atmosphere without recovering into the recovery vessel 18. In the view point of reusing the pressurized fluid to avoid its waste, it is preferable to recover it into the recovery vessel 18.

After the pressurized fluid in the hollow portion is discharged, the mold 3 is opened to remove the injection-molded article.

Figure 5:
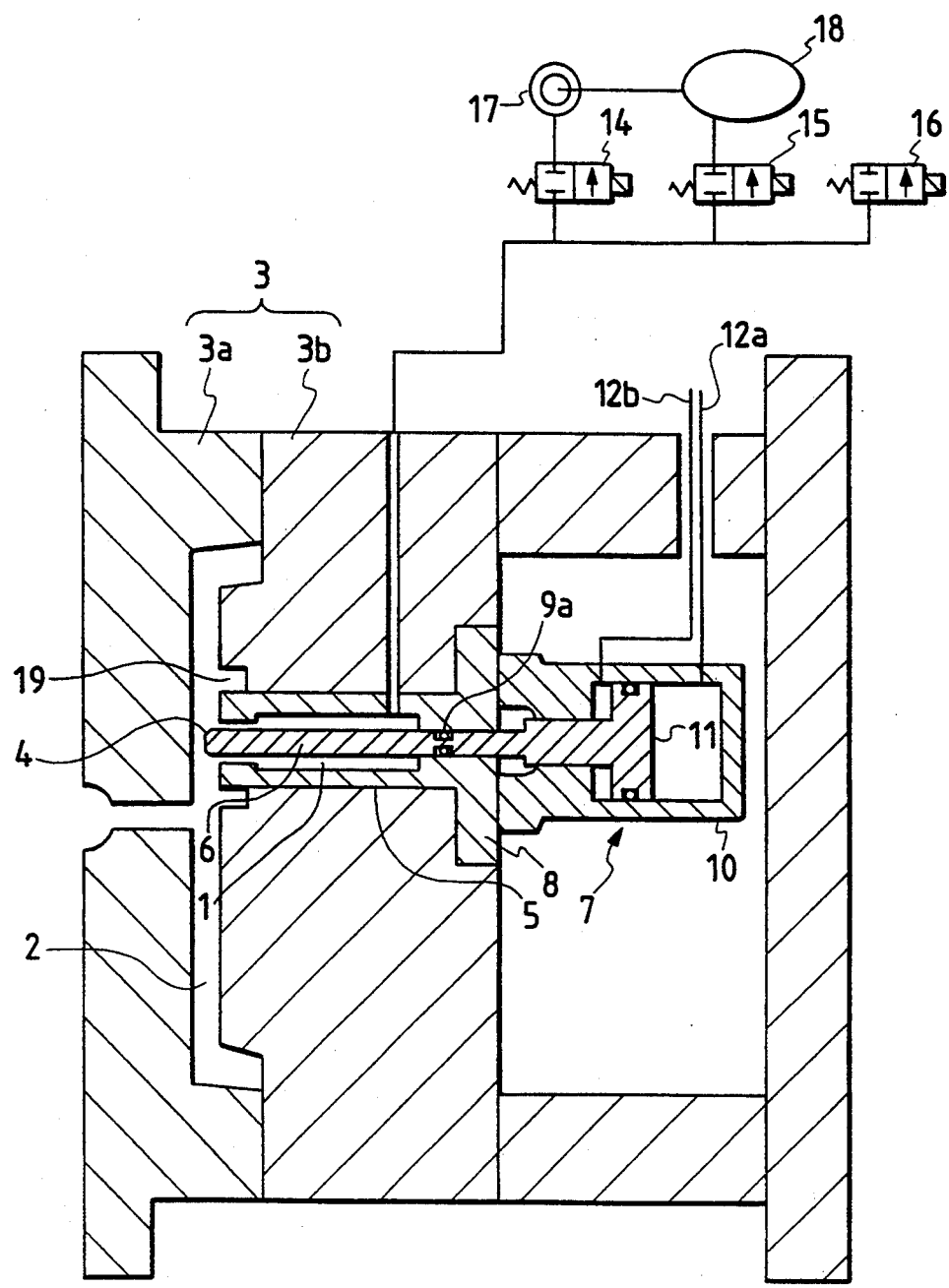
FIG. 5 is a longitudinal section view showing a second embodiment of the invention.

FIG. 5 shows a second embodiment of the pressurized fluid introducing and discharging apparatus of the invention. The embodiment is approximately the same as the above-described first embodiment, but differs from the apparatus of FIG. 1 in that an annular groove 19 is formed in the periphery of the front end of the sleeve 5.

The annular groove 19 causes the resin to closely contact with the periphery of the front end of the sleeve 5 so as to prevent the pressurized fluid from leaking out through the interface of the sleeve 5 and the mold 3 (movable mold 3b). Therefore, the provision of the annular groove 19 can more surely prevent leakage of the pressurized fluid.

Particularly, the annular groove 19 is provided so as to prevent the generation of a gap between the resin in the annular groove 19 and sleeve 5 by shrinking the molten resin in the annular groove 19 toward sleeve 5 when the molten resin in the mold cavity cools down. Therefore, the annular groove 19 is preferably formed so as to be separated and independent from ribs and projections which are to be formed in an injection-molded article.

In FIG. 5, the reference numerals identical with FIG. 1 designate the same components as those of FIG. 1.

Figure 6:
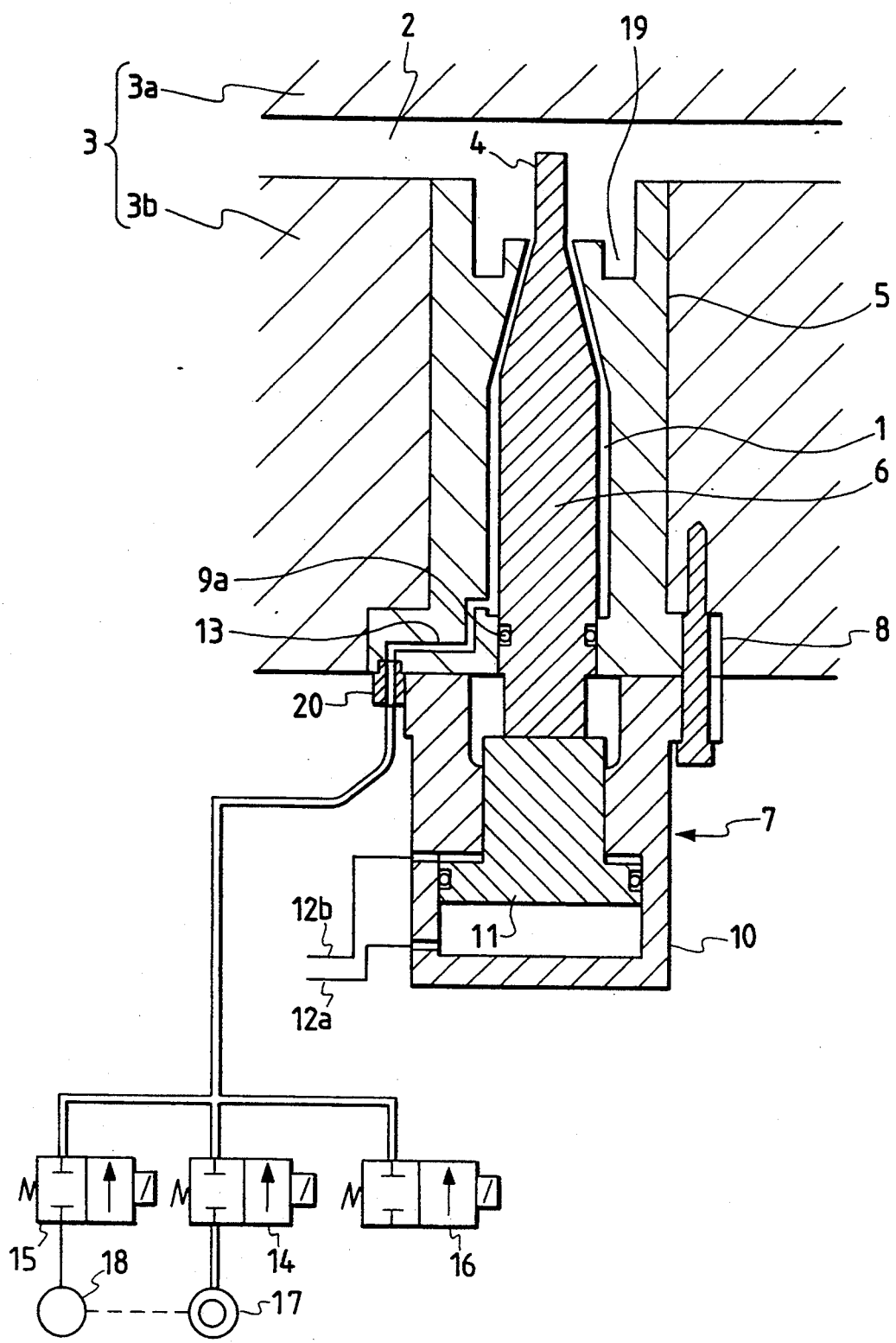
FIG. 6 is a longitudinal section view showing a third embodiment of the invention.

FIG. 6 shows a third embodiment of the pressurized fluid introducing and discharging apparatus of the invention. In the same manner as the apparatus illustrated in FIG. 1, among the stationary mold 3a and movable mold 3b which constitute the mold 3, the pressurized fluid introducing and discharging apparatus is disposed in the the movable mold 3b.

The pressurized fluid introducing and discharging apparatus is also basically the same as the apparatus illustrated in conjunction with FIG. 1, however the apparatus is different in the mechanism by which the width of the opening portion of the pressurized fluid passage 1 in the side of the mold 3 is changed from the narrowed state to the widened state or vice versa, and the like. Hereinafter, the description will be made laying stress on this difference. The same reference numerals designate the same components as those of FIG. 1.

In the pressurized fluid introducing and discharging apparatus, the annular groove 19 as described in the second embodiment is disposed on the front end face of the sleeve 5. The pressurized fluid supply and drain passage 13 opens from the sleeve 5 directly to outside the mold 3 without passing through the mold 3, and to which the introduction control valve 14, the recovery control valve 15, and the atmospheric release control valve 16 are connected through a connecting fitting 20 which is disposed in the outer face side of the mold 3. In the same manner as the first embodiment, the pressurized fluid source 17 is connected to the introduction control valve 14, and the recovery vessel 18 is connected to the recovery control valve 15.

The inner face of the front end side of the sleeve 5 is formed as a taper face which gradually increases in inner diameter in the direction from the front end to the rear end. The front end side of the shaft core 6 has a taper face corresponding to the taper face of the inner face of the sleeve 5.

The shaft core 6 is positioned along center axis thereof by the driving device 7. By sliding the shaft core 6 along the center axis, the width of the opening portion of the pressurized fluid passage 1 in the side of the mold 3 can be changed from the narrowed state to the widened state or vice versa.

That is, FIG. 6 shows the state wherein a hydraulic pressure is applied through the hydraulic line 12a to the driving device 7 and the advance of the piston 11 causes the shaft core 6 to be advanced. In this state, the taper faces of the sleeve 5 and that of the shaft core 6 are close to each other so that the opening portion of the pressurized fluid passage 1 in the side of the mold 3 is in the narrowed state.

In the state, when a hydraulic pressure is applied in the above state through the hydraulic line 12b to the driving device 7 so that the retraction of the piston 11 causes the shaft 6 to be retracted, the taper faces of the sleeve 5 and the shaft core 6 are separated from each other, whereby the opening portion of the pressurized fluid passage 1 in the side of the mold 3 is in the widened state.

If the transformation from the narrowed state to the widened state or vice versa is conducted in the above-described manner, this transformation between the two states can be easily conducted even when the driving device 7 has a short stroke. Therefore, the driving device 7 can be miniaturized.

Figure 7:
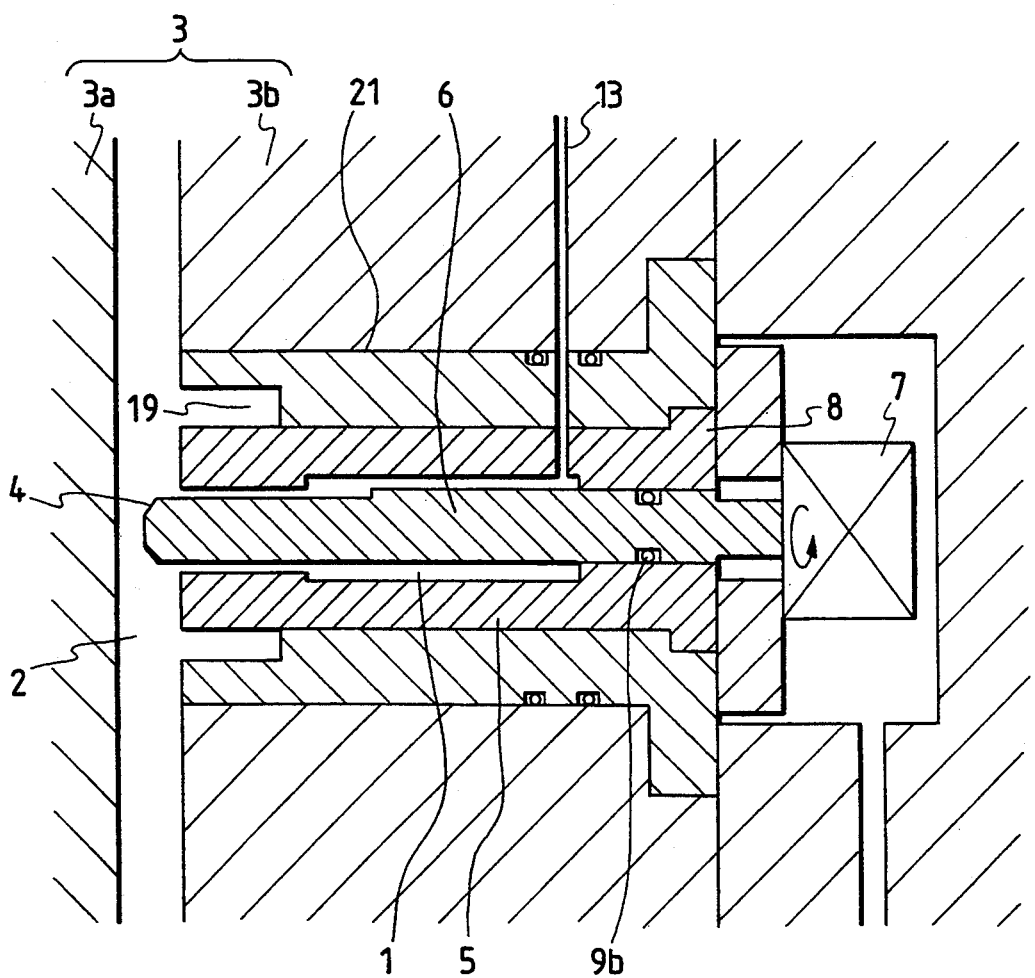
FIG. 7 is a longitudinal section view showing a fourth embodiment of the invention.

FIGS. 7 and 8 show a fourth embodiment of the pressurized fluid introducing and discharging apparatus of the invention. The embodiment is approximately the same as the first embodiment except that the shaft core 6 is rotated about its center axis by the driving device 7, a bushing 21 is disposed outside the sleeve 5, and the annular groove 19 described in the second embodiment is formed on the front end face of the bushing 21. The identical reference numerals designate the same components as those of FIG. 1.

The pressurized fluid introducing and discharging apparatus will be further described.

The sleeve 5 has a cylindrical shape, opens at the front end in the mold cavity 2, and the sleeve is locked in the bush 21 inserted into the movable mold 3b by the flange 8 formed at the rear end. The inner diameter of the sleeve is small at the front and rear end portions, and large at the intermediate portion.

The substantially columnar shaft core 6 is inserted into the sleeve 5. In the front and rear end portions having a small inner diameter of the sleeve 5, the shaft core 6 is fitted to the sleeve 5 such that the rotation of the shaft core 6 is not disturbed. At the intermediate portion at which the sleeve 5 has a large inner diameter, a gap of the size sufficient for serving as the pressurized fluid passage 1 is formed between the sleeve 5 and the shaft core 6. An O-ring 9b functioning as a seal is disposed between the inner face of the rear end of the sleeve 5 having a smaller inner diameter and the shaft core 6.

Grooves 22a and 22b are formed respectively in a part of the inner face of the front-end of the sleeve 5 having the smaller inner diameter, and a part of the outer face of the front end of the shaft core 6 which is fitted into the front end of the sleeve 5. Each of the grooves 22a and 22b constitutes a part of the pressurized fluid passage 1, and is continuous with the pressurized fluid passage 1 which is formed between the shaft core 6 and the intermediate portion of the sleeve 5 having the large inner diameter. Generally, the grooves 22a and 22b are formed in parallel with the center axis of the shaft core 6. Alternatively, both the grooves 22a and 22b may be inclined in the same direction.

Figure 8A:
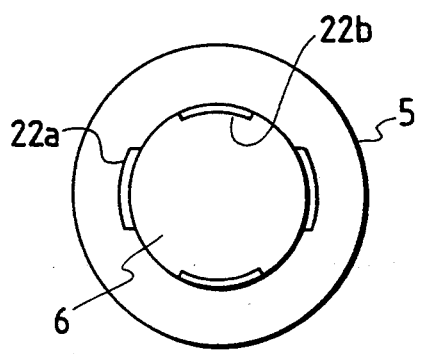
FIG. 8 is a diagram illustrating the narrowed and widened states in the fourth embodiment of the invention.
Figure 8B:
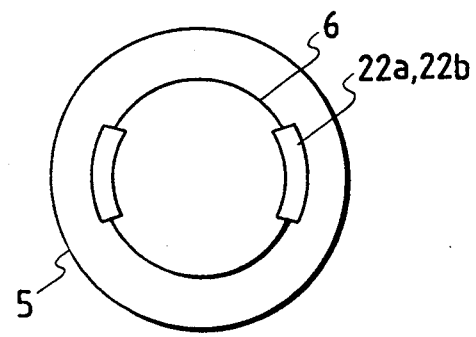

In the embodiment, the opening portion of the pressurized fluid passage 1 in the side of the mold 3 is formed by the grooves 22a and 22b so as to be arcuate as viewed from the inner face side of the mold 3. As shown in FIG. 8, the grooves 22a of the sleeve 5 and the grooves 22b of the shaft core 6 are selectively positioned by the rotation of the shaft core 6 so as to be at either of the position where the grooves are displaced from each other and that where the grooves are positionally coincide with each other. When the grooves are at the displaced positions shown in FIG. 8(a), the grooves constitute the narrowed state, and, when the grooves are at the coincident positions shown in FIG. 8(b), the grooves constitute the widened state.

The inner portion of the front end of the bushing 21 is cut away so that an annular groove 19 is formed between the bush and the periphery of the front end of the sleeve 5. The bush 21 is locked into the mold 3 (movable mold 3b) by a flange 23 which is formed at the rear end.

If the state of the opening portion of the pressurized fluid passage 1 in the side of the mold 3 is transformed from the narrowed state to the widened state or vice versa in the manner as the embodiment, there is an advantage that no large change occurs in both the narrowed and widened states even when the rotation amount of the shaft core 6 is somewhat deviated. The transformation based on the rotation may be used in combination with the above-described slide movement of the shaft core 6. Furthermore, the groove 22a and/or 22b of the embodiment may be formed on the taper faces of the sleeve 5 and/or the shaft core 6 which are described in the third embodiment, so that the narrowed state is formed when the two taper faces closely contact with each other during the advance of the shaft core 6 and the widened state is formed by the retraction and/or rotation of the shaft core 6.

Figure 9:
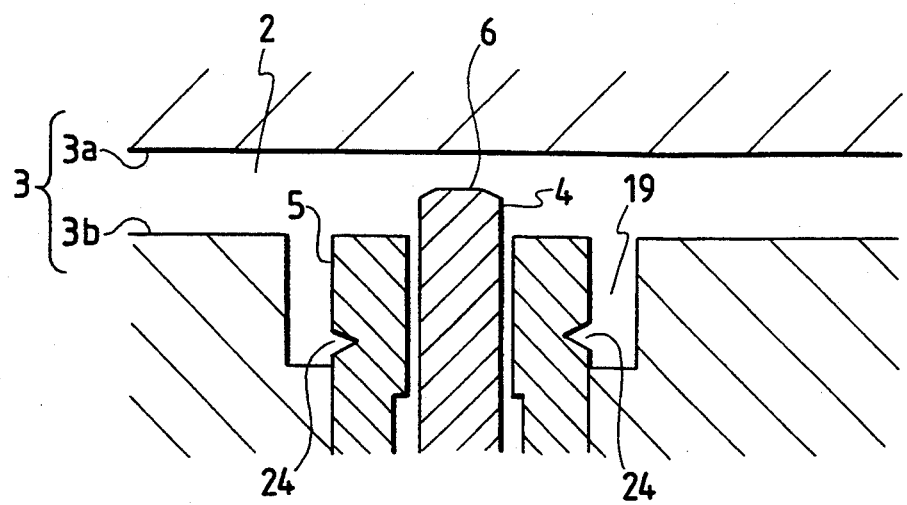
FIG. 9 is a longitudinal section view showing a fifth embodiment of the invention.
Figure 10:
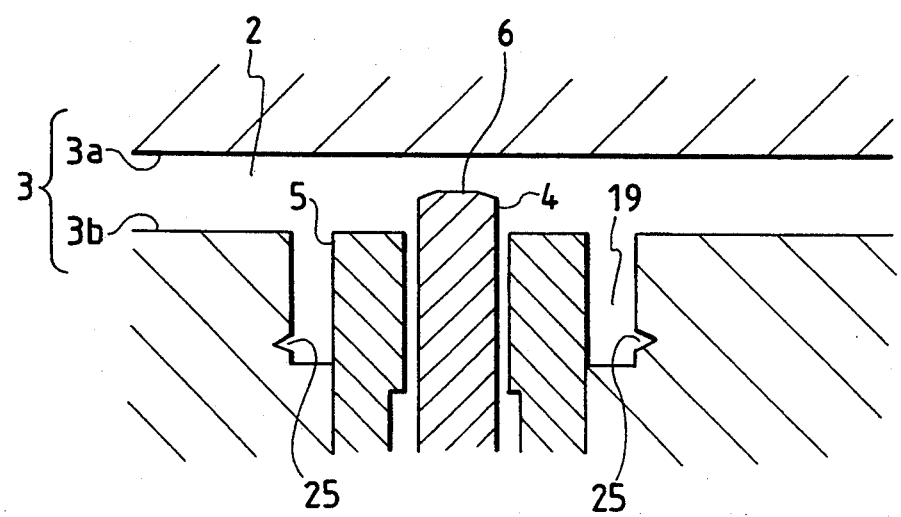
FIG. 10 is a longitudinal section view showing a sixth embodiment of the invention.
Figure 11:
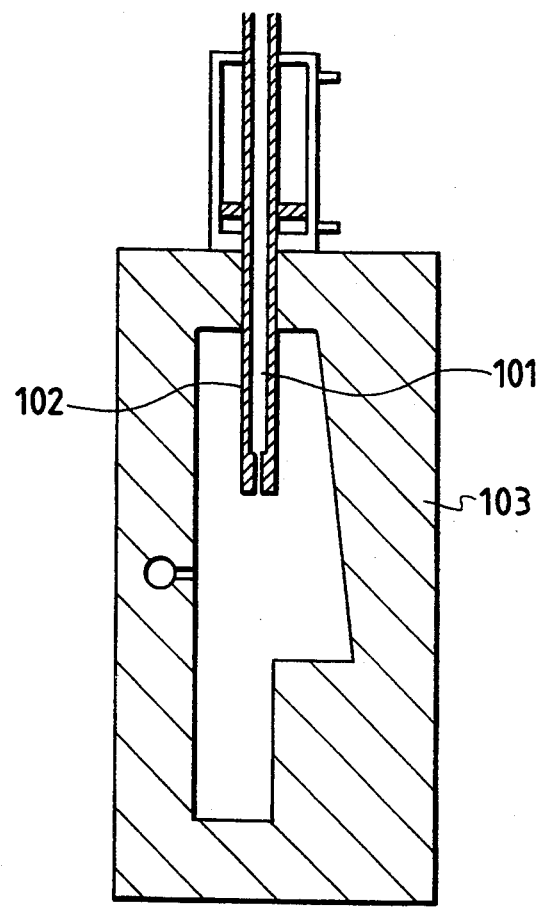
FIG. 11 is a diagram illustrating the prior art.
Figure 12:
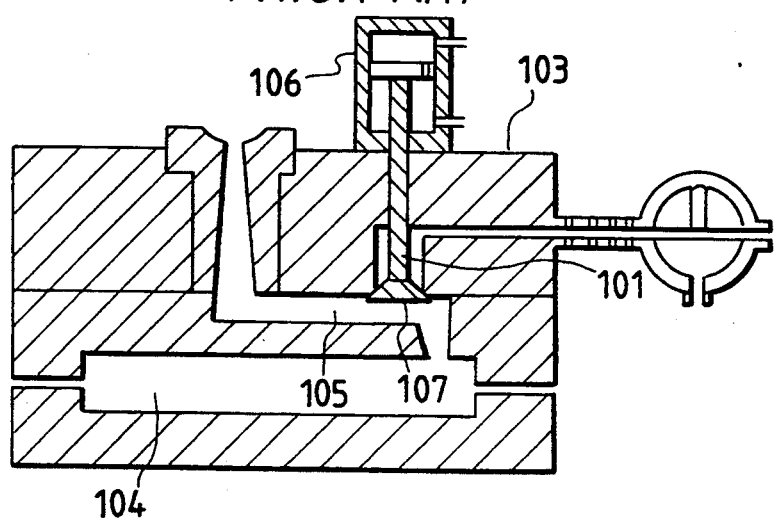
FIG. 12 is a diagram illustrating the prior art.

FIGS. 9 and 10 are fifth and sixth embodiments of the pressurized fluid introducing and discharging apparatus of the invention, and show modifications of the embodiment. In the figures, the identical reference numerals designate the same components as those of FIG. 5. These embodiments have characteristic portion which a recess 24 or 25 is formed on the inner or outer wall of the annular groove 19. In the embodiment as shown in FIG. 9, the recess 24 is formed on the inner wall of the annular groove 19, and, in the embodiment as shown in FIG. 10, the recess 25 is formed on the outer wall of the annular groove 19. The section shapes of the recesses 24 and 25 are not restricted to the illustrated triangular shape, and may be rectangular, semicircular, or the like.

If the recess 24 or 25 is not formed, the resin in the annular groove 19 may perform an action in which the resin is lifted upward (as viewed in the figure) by the shrinkage during the solidification of the molten resin. Since the resin portion in the recess 24 engages with the inner wall, the lifting can be surely prevented from occurring. Also when the shrinkage causes a gap to be formed between the outer wall of the annular groove 19 and the solidifying resin, the same function is performed. Therefore, the effect that the introduced pressurized fluid becomes difficult to move in the mold cavity along the wall of the annular groove 19 is further assured. The recess 24 or 25 may be formed so as to surround annularly the whole of the inner or outer wall of the annular groove 19. Alternatively, the recess 24 or 25 may be formed as spots distributed on the inner or outer wall. In either case, the sealing performance can be exhibited. If the recess 24 or 25 is formed as spots, their shape may be in the shape of a circular cone, a truncated cone, a hemisphere and the like. In the illustrated examples, the recess 24 or 25 is formed on the inner or outer wall of the annular groove 19. Alternatively, a recess may be formed on the bottom face of the annular groove 19. Although the embodiments of FIGS. 9 and 10 are modifications of the embodiment of FIG. 5, the configurations shown in FIGS. 9 and 10 can attain the same effects even when they are applied to those of FIGS. 6 and 7.

INDUSTRIAL APPLICABILITY

The invention which is configured as described above can attain the following effects:

(1) Since the width of the opening portion of the pressurized fluid passage 1 in the side of the mold 3 can be easily set to a value at which the pressurized fluid can pass through the opening portion but the molten resin cannot enter the opening portion, the clogging of the pressurized fluid passage 1 caused by a backflow of the molten resin can be prevented from occurring. On the other hand, since the width of the opening portion can be increased when the pressurized fluid in a hollow portion is to be discharged, the discharging period can be shortened, thereby eliminating the disadvantage that the mold cycle is prolonged and the mold efficiency is reduced.

(2) Since the pressurized fluid is guided by the guide face 4 toward the interior of the mold 3, the pressurized fluid can be prevented from leaking out through the interface of the molten resin and the inner face of the mold 3, so that the pressurized fluid is surely introduced into a deep portion of the molten resin.

(3) The leakage of the pressurized fluid can be prevented from occurring as described above. Accordingly, a required hollow portion can be surely formed, and the pressure of the pressurized fluid can be surely maintained, whereby a hollow injection-molded article with an excellent reproducibility can be obtained.

We claim:

1. A method for forming a hollow injection-molded article, wherein a pressurized fluid is introduced through a pressurized fluid passage into a mold having a mold cavity containing a molten resin, and, after the molten resin in the mold cavity cools and solidifies, the pressurized fluid is discharged from the mold cavity through the pressurized fluid passage and the hollow injection molded article is then removed from the mold, the method comprising the steps of:

setting an opening portion of the pressurized fluid passage at a side of the mold to a narrowed state, such that the pressurized fluid can flow through the opening portion while discouraging the molten resin from backflowing into the opening portion;

projecting a guide face into the mold cavity from the opening portion of the pressurized fluid passage;

injecting the molten resin into the mold cavity;

injecting the pressurized fluid into the mold cavity;

setting the opening portion of the pressurized fluid passage from the narrowed state to a widened state; and discharging the pressurized fluid from the mold cavity through the pressurized fluid passage.

2. The method according to claim 1, wherein the pressurized fluid passage is a gap between a sleeve and a core inserted into the sleeve, a forward end portion of the core providing the guide face, the steps of setting the narrowed and widened states of the opening portion of the pressurized fluid passage are performed by changing positions of the core, and the projecting step is performed by projecting the core into the mold cavity, such that the pressurized fluid is guided by the guide face for proper introduction into the molten resin contained in the mold cavity.

3. The method according to claim 2, wherein the setting steps are performed by reciprocating the core along an axis of the sleeve between positions defining the narrowed and widened states of the opening portion of the pressurized fluid passage.

4. The method according to claim 1, wherein the injecting step is performed in the presence of an annular groove in a front end portion of the sleeve, whereby to promote proper introduction of the pressurized fluid into the molten resin in the mold cavity.

5. The method according to claim 4, wherein the injecting step is performed in the presence of at least one recess in a wall of the annular groove.

6. The method according to claim 1, wherein the step of setting the opening portion of the pressurized fluid introducing passage to the narrowed state is performed during a period from a start of the step of injecting the molten resin into the mold cavity to a start of the step of discharging the pressurized fluid from the mold cavity, and the step of setting the opening portion of the pressurized fluid introducing passage to the widened state is performed prior to the step of discharging the pressurized fluid from the mold cavity.

7. The method according to claim 1, wherein the injecting step includes connecting a pressurized fluid source to the pressurized fluid passage, and the discharging step includes connecting the pressurized fluid introducing passage to a recovery vessel.

8. Apparatus for introducing pressurized fluid into and discharging pressurized fluid from a mold providing a mold cavity into which a molten resin is injected, the apparatus comprising:

a sleeve having a front end opening into the mold cavity through a wall of the mold and an inner surface;

a core inserted into the sleeve, the core having a front end portion and an outer surface disposed relative to the sleeve inner surface to define a passage in fluid communication with the mold cavity, the sleeve inner surface and the core outer surface having configurations adjacent a portion of the passage opening into the mold cavity such that a dimension of the passage opening portion can be changed between widened and narrowed states depending upon a position of the core; and means for selectively positioning the core to achieve the widened and narrowed states of the passage opening portion, in the narrowed state, pressurized fluid being capable of readily flowing forwardly through the passage opening portion into the mold cavity while molten resin being essentially incapable of backflowing through the passage opening portion and the front end portion of the core projecting into the mold cavity beyond the front end of the sleeve to serve as a guide face for properly directing the pressurized fluid into the molten resin in the mold cavity to create a hollow injection-molded plastic article, and in the widened state, pressurized fluid being discharged from the mold cavity through the passage opening portion.

9. The apparatus according to claim 8, wherein a diameter of the sleeve inner surface adjacent the sleeve front end is reduced relative to a diameter of the sleeve inner surface removed from the sleeve front end, and wherein the positioning means axially shifts the core to a forward position such that the narrowed state is defined by a gap between the sleeve inner surface adjacent the sleeve front end and the core outer surface, and the positioning means shifts the core to a rearward position such that the widened state is defined by a gap between the sleeve inner surface removed from the sleeve front end and the core outer surface.

10. The apparatus according to claim 8, wherein the sleeve inner surface adjacent the sleeve front end and the core outer surface adjacent the core front end portion are correspondingly tapered, such that shifting an axial position of the core changes a gap between the sleeve tapered inner surface and the core tapered outer surface to define the narrowed and widened states of the opening portion of the passage.

11. The apparatus according to claim 8, wherein grooves are provided in the inner surface of the sleeve and the outer surface of the core, and wherein the positioning mean rotates the core between an annular position wherein the grooves are in angularly displaced relation to create the narrowed state of the passage opening portion and a position wherein the grooves are in radially aligned relation to create the widened state of the passage opening portion.

12. The apparatus according to claim 8, which further includes an annular groove surrounding the passage opening portion and located in a surface facing the mold cavity.

13. The apparatus according to claim 12, further including a bushing into which the sleeve is inserted, a front end face of the bushing being notched to provide the annular groove in surrounding relation with the end face of the sleeve.

14. The apparatus according to claim 11 or 12, further including at least one recess provided in a wall of the annular groove.

15. The apparatus according to claim 8, further including a pressurized fluid source and a recovery vessel selectively connected in pressurized fluid communication with the passage.

* * * * *